Figure 1:
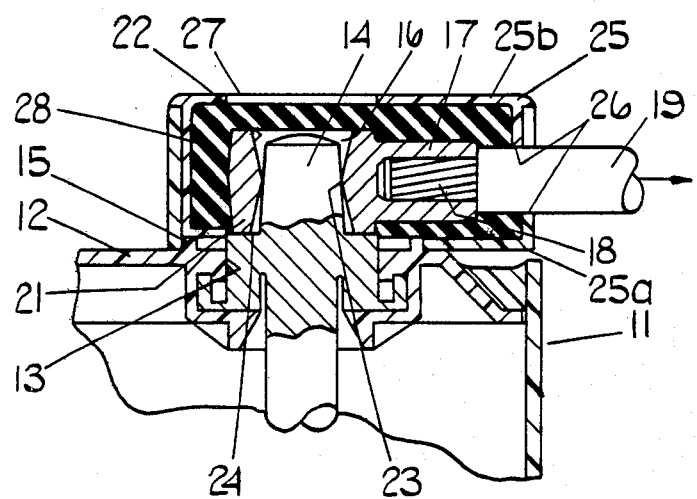

United States Patent [19]

Woodhouse

[11] 4,389,471
[45] Jun. 21, 1983

[54] ELECTRIC STORAGE BATTERIES

[75] Inventor: John L. Woodhouse, Kingshurst, England

[73] Assignee: Lucas Industries Limited, Birmingham, England

[21] Appl. No.: 230,085

[22] Filed: Jan. 30, 1981

Related U.S. Application Data

[63] Continuation-in-part of Ser. No. 102,309, Dec. 11, 1979, abandoned.

[30] Foreign Application Priority Data

Dec. 16, 1978 [GB] United Kingdom ............... 48818/78
Dec. 16, 1978 [GB] United Kingdom ............... 48819/78

[51] Int. Cl.³ .......................................... H01M 2/02
[52] U.S. Cl. .................................... 429/178; 429/181
[58] Field of Search ................ 429/178, 179, 180–184

[56] References Cited

U.S. PATENT DOCUMENTS

| | | | |
|---|---|---|---|
| 3,687,734 | 8/1972 | Orlando et al. | 429/178 X |
| 3,704,173 | 11/1972 | McClelland et al. | 429/181 X |
| 4,078,122 | 3/1978 | Lötzsch | 429/178 X |
| 4,117,211 | 9/1978 | Schuster et al. | 429/178 X |
| 4,179,545 | 12/1979 | Ciliberti, Jr. | 429/178 X |

*Primary Examiner*—Charles F. LeFevour
*Attorney, Agent, or Firm*—Ladas & Parry

[57] ABSTRACT

An electric storage battery is provided with a connector for making an external electrical connection to the battery. The connector includes a hollow conductive body mounted on and welded to a terminal of the battery, and a flexible conductive cable connected to and extending from the body. The bore in the body is non-complementary with the terminal and is shaped so that the wall of the bore defines intermediate its ends a projecting portion which engages the terminal. The weld between the terminal and the conductive body is restricted to the region thereof between the projecting portion and the outer end of the terminal.

2 Claims, 2 Drawing Figures

U.S. Patent  Jun. 21, 1983  4,389,471

ELECTRIC STORAGE BATTERIES

CROSS-REFERENCE TO RELATED APPLICATION

This application is a continuation-in-part application of co-pending U.S. application Ser. No. 102,309, filed Dec. 11, 1979 now abandoned.

This invention relates to electric storage batteries, particularly lead-acid batteries for powering electrically driven vehicles.

In an electrically driven vehicle, it is normal to use a pack of series connected electric storage batteries, particularly lead-acid batteries, to provide the required motive power for the vehicle. In order to interconnect each battery in the pack to an adjacent battery or to an external electrical component, such as a vehicle drive motor, it is known to use a flexible connector including a conductive member formed with a bore complementary with a respective battery terminal so that the conductive member can be mounted on and welded to the terminal. In addition, this known connector includes a flexible electrical cable joined to the conductive member and extending therefrom so as to provide the required connection to an adjacent battery or an external component. However, this known connector suffers from the disadvantage that, if it is required to remove the connector from an associated battery terminal, for example to replace or repair the battery, the removal operation is difficult to achieve and tends to result in damage to the terminal and the connector. An object of the present invention is therefore to minimise or alleviate this disadvantage.

Accordingly, the invention resides in an electric storage battery and a connector for making an electrical connection to the battery, wherein the connector includes a hollow conductive body mounted on and welded to a terminal of the battery, and a flexible conductive cable connected to and extending from the body, and wherein the bore in the body is non-complementary with the terminal and is shaped so that the wall of the bore defines intermediate its ends a projecting portion which engages the terminal, the weld between the terminal and the conductive body being restricted to the region thereof between said projecting portion and the outer end of the terminal.

Using the battery and connector assembly described in the preceding paragraph, the restricted area of the weld between terminal and the conductive member facilitates removal of the connector without damaging the terminal. Thus, in a lead-acid battery employing a lead or lead alloy conductive member it is possible to shear the weld between the terminal and the conductive member by applying a suitable twisting force to the connector.

Preferably, the bore in the conductive body is shaped to define a clearance with the other end of the terminal. In this way, it is possible to reduce the amount of terminal corrosion experienced when using the known connector described above. Thus, although in the known connector the bore in the conductive body is shaped complementary with its associated battery terminal, manufacturing tolerances inevitably result in spaces being defined between the terminal and the conductive body. Moreover, a film of electrolyte tends to be present on the external surfaces of most storage batteries and it has been found that these spaces can become filled with electrolyte so giving rise to a site of high corrosion. However, by providing sufficient clearance between the terminal and the conductive body, it is found that this corrosion can be reduced.

Preferably, the bore in the conductive body is a through-bore and has substantially the same shape on opposite sides respectively of the projecting portion. This allows the conductive body to be mounted on the terminal from either end of the bore thereby facilitating assembly of the connector on the battery.

Figure 2:
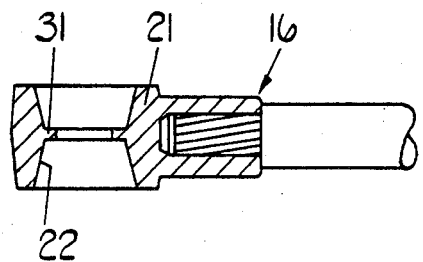

In the accompanying drawings:

FIG. 1 is a sectional view of part of a lead-acid battery and connector assembly according to one example of the present invention, and FIG. 2 is a sectional view of part of the connector according to a modification of said one example.

Referring to FIG. 1, the battery of said one example includes a box 11 which is conveniently formed from a thermoplastic material, such as polypropylene, and which is closed by a lid 12 also conveniently formed from polypropylene or another thermoplastic material. Projecting from an aperture 13 in the lid 12 is a lead or lead alloy terminal 14 which is of frusto-conical configuration and which is surrounded at its lower end by an upstanding, annular wall 15 integral with the lid 12. Mounted on the terminal 14 is a device 16 for connecting the terminal to an external electrical component, such as the next battery in a pack of batteries for powering an electrically driven vehicle. In addition, the battery includes a further terminal (not shown) identical with the terminal 14 but, for the sake of simplicity, only the terminal 14 and its associated components will be described hereinafter. It is, however, to be appreciated that the following comments apply equally to the further terminal.

The connecting device 16 includes a lead or lead alloy collar which has been mechanically deformed, conveniently by crimping, around one end of a multi-strand, flexible electrical cable 18 which is surrounded external to the collar 17 with an insulating sheath 19. Formed integrally with the collar 17 is a hollow bush 21 which, in use, is located on the terminal 14 and which includes a bore 22 tapering inwardly from each end so as to define a minimum diameter portion 23 half way between the ends of the bore. The taper at each end of the bore 22 is equal and is arranged to exceed the taper on the frusto-conical terminal 14 such that, when the bush 21 is engaged with the terminal 14 from one end of the bore 22, the tapering wall of said one end of the bore defines an angle of about 10° with the tapering wall of the terminal 14.

To mount the device 16 on the terminal 14, the bush 21 is pushed onto the terminal until it seats against a shoulder 24 on the terminal. The arrangement of the portion 22 is such that it then engages the terminal 14 as an interference fit. A flame burning operation is then performed on the outer ends of the terminal 14 and the bush 21 so as to melt material from the terminal and the bush whereby, on cooling, a welded joint is produced between the terminal and the bush. By virtue of its interference fit with the terminal 14, the portion 23 provides a barrier to the molten material produced during the flame burning operation and hence the weld is restricted to the outer ends of the terminal 14 and bush 21. In this way, it is found that, by applying a twisting force to the device 16, the weld between the device and the terminal can be readily sheared to allow, for example, rapid replacement of a faulty battery. In addition, the increased taper on the bore 22 is compared with the terminal 14 is found to provide sufficient clearance between the terminal and the bush 21 to prevent electrolyte being retained therebetween to cause electrolytic corrosion. By way of contrast, if the taper on the bore 21 is arranged to be the same as that on the terminal 14, manufacturing tolerances result in small spaces being produced between the bush and the terminal even after flame burning. Battery acid then tends to be retained in these spaces so that areas of high corrosion result. In addition, it will be appreciated that the double taper on the bore 22 of the connecting device 16 facilitates mounting of the device 17 on the terminal 14 since either end of the bore 22 can be presented to the terminal.

As an alternative to the arrangement described in the preceding paragraph, it is also possible to arrange that the bush 21 is spaced from the shoulder 24 by a predetermined air gap. This can be achieved with the aid of a removable spacer or by suitable arrangement of the dimensions of the bore 22. As a further alternative, the bush 21 can be arranged to seat against an insulating spacer trapped between the bush and the shoulder 24. As yet a further alternative, the shoulder 24 can be omitted so that the bush 21 seats against the insulating material of the lid 12. It is to be appreciated that each of the above modifications is designed so as to avoid direct contact between the terminal 14 and the lower end of the bush 21, since in this way it is possible to further reduce electrolytic corrosion of the bush and the terminal.

Mounted on the lid 12 so as to surround the terminal 14 and the conductive components of the device 16 is a hollow body 25 formed in two parts 25a, 25b from a synthetic resin material such as ABS, polypropylene or polystyrene. Each body is in the form of an open trough, with the part 25a being located on the wall 15 and the part 25b being slidably received within the part 25a so as to close the open end thereof and trap the cable 18 and its insulating sheath 19 between the walls of respective slots 26 formed in the parts 25a, 25b. Formed in the base of the part 25b is an aperture 27 which is aligned with, but spaced from, the terminal 14 and the bush 21 of the connecting device 16. Filling the space defined between the body parts 25a, 25b so as to encapsulate the terminal assembly 14, 17, 21 is a cured silicone rubber material 28.

To mount the body 25 on the battery, the part 25a is located on the wall 15 before the connecting device 16 is secured to the terminal 14. When the body part 25a is in position, the bush 21 of the device 16 is mounted on the terminal 14 and is secured thereto by flame burning, with a guard being used to protect the body part 25a during the burning operation. The body part 25b is then fitted onto the part 25a to enclose the terminal assembly 14, 17, 21 and silicone rubber is introduced, conveniently by pouring, into the space defined between the body parts 25a, 25b.

The silicone rubber is then allowed to cure to produce the required encapsulant, the end of sheath 19 within the body 25 preferably being coated with a silicone primer to which the cured silicone rubber adheres to seal the slots 26.

In use, the body 25 and the silicone rubber material 28 electrically isolate the terminal assembly 14, 17, 21 from the external surfaces of the battery box 11 and lid 12 so that, even if a film of electrolyte is present on the surfaces, earth leakage currents are prevented. Moreover, the cured silicone rubber material 28 is chosen so as to be substantially self-sealing when punctured by a needle-pointed, electrical testing probe. Thus, for example, if it is required to measure the battery voltage when the battery is assembled in a battery pack, a suitable needle-pointed testing probe can be inserted through the rubber material 28 to effect the required test substantially without the insulating properties of the encapsulant being adversely affected when the probe is removed. Thus, if the battery is found to be satisfactory, there is no need to replace the encapsulant after the test whereas, if the battery is found to be faulty, by applying a twisting force to the body 25 and thereby to the device 16, the connection between the device and the terminal 14 is readily sheared as described above.

When a twisting force is applied to the device 16 to break the connection to the terminal 14, it is found that the bush 21 and the region of the terminal 14 welded thereto shear from the remainder of the terminal along the line defined by the portion 22. Thus, if it is subsequently required to renew the connections to the terminal 14, a further device 16 can be located on the remaining portion of the terminal and then welded thereto by flame burning.

In the modification shown in FIG. 2, the connecting device 16 again includes a hollow bush 21 which, in use, is mounted on the terminal 14 and which has a bore 22 tapering inwardly from its opposite ends. However, in this modification the central portion of the bore 22 defines an integral, annular flange 31 which sealingly engages the terminal 14 when the bush 21 is mounted on the terminal. As in the previous example, the outer end of the bush 21 is welded to the terminal 14 by flame burning, with the flange 31 restricting flow of molten material during the flame burning operation so that the weld is confined to the outer ends of the terminal 14 and bush 21. Thus, in use, by applying a twisting force to the connecting device shown in FIG. 2, the weld between the device and its associated terminal can readily be sheared along the flange 31.

I claim:

1. A combination of an electric storage battery and a connector for making an electrical connection to the battery, wherein the connector includes a hollow conductive body having a bore therein mounted on and welded to a terminal of the battery and connected thereto by a weld, and a flexible conductive cable connected to and extending from the body, and wherein the bore in the body is non-complementary with the terminal and is shaped so that the wall thereof defines intermediate its ends a projecting portion which engages the terminal, the weld between the terminal and the conductive body being restricted to the region thereof between said projecting portion and the outer end of the bore, and the relative shaping of the bore and the terminal being such that a clearance is defined between the wall of the bore and the terminal in the region between the other end of the bore and said projecting portion.

2. A combination as claimed in claim 1, wherein the bore in the conductive body is a through-bore and has substantially the same shape on opposite sides respectively of the projecting portion.

* * * * *